United States Patent [19]
Davis et al.

[11] Patent Number: 5,955,542
[45] Date of Patent: Sep. 21, 1999

[54] FLAME RETARDANCE ADDITIVES FOR AROMATIC-BASED POLYMERS AND RELATED POLYMER COMPOSITIONS

[75] Inventors: Gary Charles Davis, Albany; Larry Neil Lewis, Scotia, both of N.Y.

[73] Assignee: General Electric Company, Schenectady, N.Y.

[21] Appl. No.: 08/810,100

[22] Filed: Mar. 3, 1997

[51] Int. Cl.$^6$ .................................................. C08F 220/42
[52] U.S. Cl. ......................... 525/101; 525/393; 525/431; 525/446; 525/464; 528/37; 528/43; 556/431; 556/434; 556/435
[58] Field of Search ..................................... 525/464, 101, 525/393, 431, 446; 528/43, 37; 556/431, 434, 435

[56] References Cited

U.S. PATENT DOCUMENTS

| | | |
|---|---|---|
| 3,992,427 | 11/1976 | Chandra et al. . |
| 4,780,510 | 10/1988 | Uemiya et al. ....................... 525/326.5 |
| 4,954,549 | 9/1990 | Lewis et al. . |
| 4,996,255 | 2/1991 | Davis et al. . |
| 5,010,148 | 4/1991 | Lewis . |
| 5,039,772 | 8/1991 | Davis et al. ............................... 528/15 |
| 5,169,887 | 12/1992 | Snow et al. ............................... 524/267 |
| 5,169,920 | 12/1992 | Okawa ....................................... 528/34 |

*Primary Examiner*—Robert Dawson
*Assistant Examiner*—D. Aylward
*Attorney, Agent, or Firm*—Noreen C. Johnson; Douglas E. Stoner

[57] ABSTRACT

Novel methods and compositions for improving the flame retardant capabilities of aromatic-based polymers like polycarbonate are disclosed. Other important polymer properties are substantially maintained, such as transparency. One aspect of the invention is directed to a flame retardance additive which comprises a copolymer of an aryl-containing silicone compound and a diorganic polysiloxane compound. In some preferred embodiments, the aryl-containing silicone compound is triphenyl- or diphenyl-based. This invention is also directed to new polymer compositions, which comprise an aromatic-based polymer and the flame retardance additive described above. The polymer compositions can be molded into a variety of articles which have a very useful combination of properties.

25 Claims, No Drawings

FLAME RETARDANCE ADDITIVES FOR AROMATIC-BASED POLYMERS AND RELATED POLYMER COMPOSITIONS

TECHNICAL FIELD

This invention relates generally to polymer compositions. Specifically, it relates to new techniques for improving the flame retardance of aromatic-based polymers such as polycarbonates.

BACKGROUND OF THE INVENTION

A wide variety of aromatic-based polymers are available for use in many industries, such as plastics manufacturing. Just a few examples of such polymers include polycarbonates, polyphenylene ethers, polyesters, copolymers such as acrylonitrile-butadiene-styrene (ABS), polyimide; and polymer blends such as those based on polycarbonate/ABS. The polycarbonates, for example, are very popular materials because of the attractive set of mechanical and physical properties they possess, such as impact resistance, heat resistance, and transparency.

Very often, aromatic-based polymer compositions require substantial improvement in their natural flame-retardant properties, e.g., the ability to resist flame ignition or the excessive production of heat and smoke during combustion. Silicone-based materials, such as siloxane fluids, have previously been used in these types of polymer compositions to improve flame retardance. For example, polyphenylene ether-phenylsiloxane copolymers have been prepared in the prior art. These materials exhibit flame ignition resistance characteristics which are much better than that seen with polyphenylene ether polymers by themselves. In similar fashion, copolymers of polycarbonate and silicones have been prepared, and these materials also exhibit enhanced flame retardance. Unfortunately, the preparation of these types of copolymers on an industrial level can sometimes be very difficult, since many large-scale plants cannot easily be modified to produce such materials.

Instead of incorporating a silicone material into the base polymer by copolymerization, the material can be introduced as an additive. For example, silicone fluids have been successfully incorporated into polycarbonates and other resins as flame retardance additives. Moreover, triphenyl silane compounds have been added to polycarbonates to provide transparent blends with good flame retardance properties, while phenylsilicone fluids have provided similar properties for polyphenylene ether compositions.

In almost all of these situations, the addition of a silicone material can adversely affect some of the properties of the base polymer. These effects arise in large part from the basic chemical incompatibility between silicones and the aromatic polymers. For example, most polycarbonate materials have a high refractive index—typically about 1.5–1.6. They are also highly aromatic and somewhat polar. In contrast, silicones usually have lower refractive index values (about 1.3 to 1.4), and possess considerable aliphatic character. They are also relatively non-polar. It is therefore not surprising that phase separation usually occurs when silicones are blended with polycarbonates—even when a very small amount (less than 0.1% by weight) of the silicone is used.

Nevertheless, the addition of silicones improves flame retardance (sometimes referred to herein as "FR"). For example, the rate at which heat and smoke are generated by the burning polycarbonate is reduced significantly when a silicone material is added to the polycarbonate. However, the parts which contain silicones are often extremely hazy or opaque.

One technique for improving the compatibility between aromatic-based polymers and silicone additives calls for the matching of the refractive indices. In general, the refractive index of silicone resins can be increased by incorporating phenyl groups along the silicone chain. This approach has enjoyed some success in the case of polycarbonate resins modified by the addition of phenyl silicone resin. However, while transparency appears to be retained, some of the specific flame retardance attributes, such as a reduction in heat- and smoke-release, do not exhibit significant improvement, and may in fact degrade.

Clearly, achieving a balance between a set of important properties in aromatic-based polymers can be a very difficult endeavor. In the case of polymers like polycarbonates, for example, flame retardance often must be achieved without sacrificing other critical properties like transparency. Moreover, other properties cannot be substantially affected in a negative fashion, such as tensile strength, impact strength, resistance to solvents and other chemicals, and the like. Furthermore, any new techniques for maximizing the various attributes of the polymer product should be compatible with current manufacturing processes for the base polymer, or should be suitable for incorporation into a base polymer resin in additive-form. These new techniques should also not raise the cost of the polymer product to an unacceptable level.

SUMMARY OF THE INVENTION

In response to the needs discussed above, the present inventors have discovered novel methods and compositions for improving the flame retardant capabilities of aromatic-based polymers like polycarbonate, while substantially maintaining a variety of other polymer properties, such as transparency. One aspect of the invention is directed to a flame retardance additive which comprises a copolymer of an aryl-containing silicone compound and a diorganic polysiloxane compound. In some preferred embodiments, the aryl-containing silicone compound is triphenyl- or diphenyl-based.

This invention is also directed to new polymer compositions, which comprise an aromatic-based polymer and the flame retardance additive described above. The polymer compositions can be molded into a variety of articles with a very useful combination of properties, like transparency, flame retardance, and impact strength.

Other details of the present invention will be provided in the remaining sections of this specification.

DETAILED DESCRIPTION OF THE INVENTION

The aryl-containing silicone compound used for the additive-copolymer of the present invention usually contains at least about 0.25 aryl groups per silicon atom. In some preferred embodiments, the copolymer contains at least about 0.5 aryl groups per silicon atom. These compounds usually have the structural formula

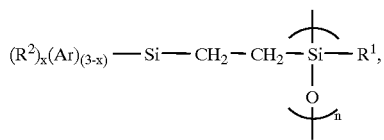

(I)

wherein Ar is an aromatic group or a substituted aromatic group;

$R^1$ is hydrogen, an alkyl group; an unsaturated alkyl group, or an aromatic group.

$R^2$ is selected from the group consisting of $C_1$ to $C_{18}$ alkyl groups (or branched or halogenated derivatives of those groups); an aromatic group or a substituted aromatic group different from the Ar group; a vinyl group; and an allyl group;

x is 0, 1 or 2; and n is from about 1 to about 100, and preferably, from 1 to about 25. (The value of "n" will depend in part on the preferred value of "m" for formula II, as described below).

In preferred embodiments, Ar is selected from phenyl, tolyl, xylyl, alkyl-substituted versions of any of the foregoing, and halogen-substituted versions of any of the foregoing. In some especially preferred embodiments, Ar is either a phenyl group or a substituted phenyl group.

The $R^1$ group usually contains less than about 10 carbon atoms. In preferred embodiments, $R^1$ is hydrogen, methyl, ethyl, vinyl, or phenyl, based on considerations such as cost and manufacturing ease.

Moreover, in preferred embodiments, x is 0 or 1, designating triaryl-based compounds or diaryl-based compounds, respectively. In some especially preferred embodiments, x is 0 (zero), i.e., designating triaryl-based compounds only. It is believed that the triaryl-based compounds usually provide the optimum level of aryl content per silicon atom, resulting in a high level of flame retardance, while the copolymer itself retains a viscosity low enough to facilitate eventual blending with the aromatic-based polymer.

Non-limiting examples of arylalkylsiloxanes which may be used as the aryl-containing silicone compounds are: methyl-2-triphenyl silyl ethyl siloxane; methyl-2-tritolyl silyl ethyl siloxane; methyl-2-diphenylmethyl silyl ethyl siloxane; and ethyl-2-triphenyl silyl ethyl siloxane.

As mentioned previously, the other, primary component of the copolymer is a diorganic polysiloxane compound. Suitable compounds of this type often conform to the formula

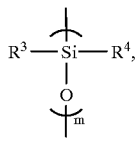

(II)

wherein $R^3$ and $R^4$ are independently selected from the group consisting of $C_1$ to $C_{18}$ alkyl groups (or branched or halogenated derivatives of those groups); an aromatic group or a substituted aromatic group; a vinyl group; and an allyl group; and m is usually in the range of about 3 to about 100. (The value of "m" will depend in part on the preferred value of "n" for formula I, as mentioned below).

In preferred embodiments, $R^3$ is methyl or ethyl (with methyl being most preferred), while $R^4$ is methyl, vinyl, phenyl, or hydrogen. Dimethylsiloxane is the most preferred compound of this type.

The relative amounts of components in the copolymer will depend in large part on the particular properties being balanced. In some primary embodiments in which transparency is a key attribute of the base polymer, the compositional ratio of the diorganic polysiloxane compound to the aryl-containing silicone compound is one which is sufficient to substantially maintain the transparency of the aromatic-based polymer, while improving the flame-retardant characteristics of the polymer. In terms of molar values, this ratio is usually in the range of about 80:20 to about 20:80, and preferably, in the range of about 50:50 to about 20:80.

The copolymer will usually have a degree of polymerization (i.e., the sum of m and n in formulae I and II, respectively) in the range of about 2 to about 200. In preferred embodiments, the degree of polymerization will often be in the range of about 5 to about 50. Techniques for preparing these types of copolymers are known in the art. Examples of the many instructive references include: *Kirk-Othmer Encyclopedia of Chemical Technology,* 3rd Edition, Vol. 20, pp. 922–943 and p. 962 et seq.; (1982); *An Introduction to the Chemistry of the Silicones,* by E. Rochow, 2nd edition (1946), John Wiley & Sons; *Silicon-Based Polymer Science,* Edited by J. Zeigler et al, 1990, American Chemical Society; and U.S. Pat. Nos. 5,010,148 (L. Lewis); 4,996,255 (G. Davis et al); and 4,954,549 (L. Lewis et al); all of which are incorporated herein by reference. The examples which follow also provide many of the details regarding sample preparations. ("M" and "D" represent monofunctional and difunctional units, respectively).

As one illustration, a cyclic tetramer like octamethylcyclotetrasiloxane ($D_4$) and a cyclic, vinyl-based siloxane like cyclic tetramethyltetravinyltetrasiloxane ($D_4^{vi}$) can together be combined in a standard, acid- or base-catalyzed ring-opening reaction. An end-capping material like hexamethyltrisiloxane (MM) is also usually present in the reaction mixture, to provide the desired molecular weight. Solvents and extraneous materials, e.g., oligomeric materials, are then usually removed by various techniques, such as vacuum stripping. The resulting intermediate is an oil which presumably conforms to the general formula $MD_xD_y^{vi}M$.

The oil can then be reacted according to a standard hydrosilation reaction, in which an aryl-containing silane compound like triphenylsilane is added across the carbon-carbon double bonds of the base polymer. The reaction usually takes place in the presence of soluble platinum catalysts, although other forms of catalysis are also possible. This reaction results in substantially all of the vinyl chains being capped with silyl groups, e.g., diphenylalkyl silyl groups or triphenylsilyl groups. After further processing to remove reaction solvents and other extraneous materials, the end product is usually recovered as a wax.

Another primary embodiment of this invention is directed to a polymer composition which comprises (a) an aromatic-based resin; and (b) a copolymer of an aryl-containing silicone compound and a diorganic polysiloxane compound.

Component (b) usually falls within the scope of formulae (I) and (II) above. Copolymers based in part on triaryl-containing siloxanes are especially preferred for some of these inventive embodiments. The ratio of the aryl-containing silicone compound to the diorganic polysiloxane compound is as described previously.

Usually, component (b) is present in an amount sufficient to provide flame retardance for the aromatic-based polymer, while also retaining substantial transparency for articles formed from the polymer composition, as demonstrated in the examples. In general, component (b) will be present at a level in the range of about 0.1% by weight to about 10% by weight, based on the total solids weight of the polymer composition. In many preferred embodiments, the level will be in the range of about 0.5% by weight to about 2% by weight. Component (b) preferably contains sufficient aryl content to provide a refractive index in the range of about 1.55 to about 1.65 for the copolymer.

As mentioned previously, the aromatic-based polymer may constitute a variety of materials, such as polycarbonates, polyphenylene ethers, polyimides, polyesters, copolymers such as acrylonitrile-butadiene-styrene (ABS); and polymer blends such as those based on polycarbonate/ABS. The preparation of all of these polymers is generally well-known in the art.

Polycarbonates such as those based on bisphenol A are thought to be especially enhanced by the copolymer-additives of the present invention. These materials often have an intrinsic viscosity of from about 0.35 to 1.8 dl/g in chloroform at 25° C. Polycarbonates are generally well-known in the art and described in many references, such as the patents listed above; *Organic Polymer Chemistry*, by K. J. Saunders, 1973, Chapman and Hall Ltd., as well as in the following U.S. patents, all of which are incorporated herein by reference: U.S. Pat. Nos. 3,028,365; 3,442,854; 4,185,009; 4,605,731; 4,701,519; 4,724,134; 5,026,817; and 5,097,002. They can be made by a variety of techniques, such as direct phosgenation and ester interchange (the latter is often referred to as "transesterification"). Direct phosgenation can be carried out by an interfacial technique, which involves the reaction of an aromatic dihydroxy compound such as bisphenol A with phosgene. Copolycarbonates, e.g., polyesterpolycarbonates, are also within the scope of the present invention.

Methods for blending the copolymer-additive and the aromatic-based polymer, such as extruder feeding, are known in the art. (The base polymer is usually in either powder or pellet form). Standard mixers may be used to initially blend the components and any other additives. This blending can be followed by extrusion at elevated temperatures, e.g., above the glass transition temperature ($T_g$) of the base polymer. Those skilled in chemical processing will be able to select the most appropriate blending and heating parameters without undue experimentation.

The other additives which may sometimes be incorporated into the blend are also known in the art. Examples of such materials include plasticizers, mold release agents, melt viscosity reducers, colorants, stabilizers, antioxidants, mineral fillers or inert fillers (e.g., silica, carbon fibers, glass fibers), lubricants, thermal stabilizers, UV stabilizers, and other flame retardants. These materials are usually employed at about 0.1 wt. % to about 50 wt. %, based on the total weight of the composition.

The polymer compositions of the present invention may be used to form a variety of products, such as glazing and various structures, e.g., housings for computers and other types of business equipment. Thus, articles formed from the polymer compositions are also within the scope of this invention.

EXAMPLES

These examples are merely illustrative, and should not be construed to be any sort of limitation on the scope of the claimed invention.

Example 1

A copolymer of the type $MD^{vi}_x D_y M$ was prepared as follows: $D_4^{vi}$ (25 g, 0.29 mol $D^{vi}$), $D_4$ (7.17 g, 0.097 mol D) and MM (2.95 g, 0.0182 mol MM) were combined neat with potassium hydroxide (KOH) (10 mg), and then heated at 150° C. for 17 hours. The mixture was then vacuum-stripped at 150° C. and 1 mm mercury, until about one-half of the original volume was removed, leaving an oil which had a viscosity of about 110 cps. The resulting oil (8.5 g) was combined with triphenyl silane ($Ph_3SiH$) (18.2 g, 0.07 mol) in toluene (80 mL). A platinum catalyst was then added (100 microliters of a 5% by weight platinum solution of $Pt(M^{vi}M^{vi})_x$ in xylene, sometimes referred to as "Karstedt's Catalyst"). The mixture was then stirred and heated at reflux for about 24 hours, followed by removal of toluene in vacuum. The resulting material was a hard wax.

The wax (10 g) was blended at 1 wt. % into a bisphenol A (BPA)-based polycarbonate powder (990 g), using a Henschel mixer. The blend was extruded on a 1.25-inch Wellex single screw extruder equipped with a general purpose screw. The barrel set temperatures were as follows: zone 1: 350° F.; zone 2: 535° F.; zone 3: 535° F. The die temperature was 530° F. The screw rate was 150 rpm, and the feed rate was about 20 lbs/hr. The pellets were dried at 120° C. for at least 4 hours prior to molding. Test plaques based on Ohio State University (OSU) specifications (4-inches by 6-inches by 1/16-inch) were compression-molded at 550° F. Injection-molded plaques were prepared on a 30 ton Engel Injection Molder. Molder barrel set temperatures were as follows: zone 1 (nozzle) was 560° F.; zones 2 and 3 were 560° F.; and zone 4 was 500° F. The mold set temperature was 180° F. Injection pressure was set at 10 psi. Injection molding time was 8 seconds, with a 20 second cooling period. Total cycle time was 35 seconds. The haze results and transmittance results are listed in Table 1.

Example 2

Another copolymer of the type $MD^{vi}_x D_y M$ was prepared as follows: $D_4^{vi}$ (24.95 g, 0.29 mol $D^{vi}$), $D_4$ (4.4 g, 0.059 mol D) and $MD_2M$ (5.74 g, 0.037 mol M,D) were combined neat. $KOSiMe_3$ (1.3 mg, 10 mmol) was then added, and the mixture was heated at 150° C. for 24 hours. The resulting mixture was neutralized with $H_3PO_4$ (2 mL of a 0.0147 mol/L aqueous stock solution). The mixture was then subjected to vacuum stripping at 150° C., 1 mm mercury, to give 22 g of an oil. Analysis by $^{29}Si$ NMR showed that the copolymer had a ratio of $M:D:D^{vi}$ of 1:1.6:42.1. This polymer (5 g) was combined with $Ph_3SiH$ (15 g, 0.058 mol) and platinum catalyst, as described previously for Example 1. The resulting mixture was then heated at 150° C. for 2 hours. The oil was blended into polycarbonate at 1 wt. %, and the blend which resulted was extruded, molded, and tested as in Example 1.

Example 3

Another copolymer of the type $MD^{vi}_x D_y M$ was prepared as follows: $D_4^{vi}$ (7.49 g, 0.087 mol $D^{vi}$), $D_4$ (23.4 g, 0.317 mol D) and $MD_2M$ (5.64 g, 0.036 mol M,D) were combined neat. $KOSiMe_3$ (1.8 mg, 14 mmol) was then added, followed by heating at 150° C. for 24 hours. The mixture was neutralized with $H_3PO_4$ (2 mL of a 0.0147 mol/L aqueous stock solution). This mixture was vacuum-stripped as described in Example 2, to give 7 g of an oil. Analysis by $^{29}Si$ NMR showed that the copolymer had a ratio of $M:D:D^{vi}$ of 1:1.48:0.18. This polymer (6.24 g, 58 mmol vinyl content) was combined with $Ph_3SiH$ (15 g, 0.058 mol) and platinum catalyst (as described in Example 1). The resulting mixture was heated at 150° C. for 5 hours. The mixture was then vacuum-stripped at 150° C., 1 mm mercury, for 17 hours, to give an oil. The oil was blended at 1 wt. % with polycarbonate. The resulting blend was extruded, molded, and tested, as in Example 1.

One important evaluation of flame retardance is the well-known Ohio State University Test (OSU; ASTM Designation: E906-83), in which $\frac{1}{16}$-inch test pieces are burned, and the rate at which smoke and heat are generated is measured. This test is important for characterizing materials which are to be used in an environment where easy escape from a fire would be difficult, e.g., office buildings and airplanes. In the table, ΔHRR represents heat-release rate, while ΔSRR represents smoke-release rate, and the corresponding numerical values represent the percentage-change from control sample 1. The refractive index values were measured with a Bausch and Lomb refractometer. The haze- and transmittance values were measured with a Pacific Scientific XL-835 Colorimeter.

The results for the present examples can be found in Table 1:

TABLE 1

| Sample # | Additive[a] (Copolymer) | Refractive Index | Trans- mittance | Haze | Δ HRR[b] (%) | Δ SRR[b] (%) |
|---|---|---|---|---|---|---|
| 1* | None | — | 90.2 | 0.8 | 0.0 | 0.0 |
| 2 | $MD_xM^d$ | 1.4015 | 36.9 | 100 | −29 | −54 |
| 3 | $MD_xD'_yM^e$ | — | 76.8 | 35.7 | −39 | −48 |
| 4 | $MD_xD'_yM^f$ | 1.5970 | 90.3 | 0.8 | −24 | −22 |
| 5 | $MD_xD'_yM^g$ | 1.6011 | 87.2 | 2.7 | −17 | −15 |
| 6 | $MD_x^{Ph}M^h$ | 1.5540 | 90.1 | 2.4 | +6 | +11 |

* = Control Sample
[a])Additive incorporated into BPA-based polycarbonate at 1 wt. %.

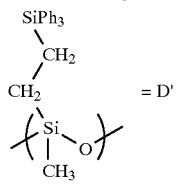
= D' b) Δ HRR = heat-release rate; % change from control sample 1; negative numbers indicate decreases.
c) Δ SRR = smoke-release rate; % change from control sample 1; negative numbers indicate decreases.
d) x = 50
e) y/x = 3
f) y/x = 26
g) y/x = 6.2
h) x = 20

The additive of sample 2 is based solely on polydimethylsiloxane (PDMS), and is outside the scope of this invention. Its use resulted in an improvement in minimizing the generation of heat and smoke, but the transmittance and haze values were unacceptable.

Samples 3 to 5 constitute part of the present invention, and generally demonstrate the benefits of the copolymer-additive, in terms of flame retardance according to OSU standards, and optical characteristics of the base polymer. In regard to sample 3, the flame retardance values are very good, while the optical characteristics would be deemed acceptable for some (but not all) product applications.

The material of sample 6 is a commercial polymethylphenylsiloxane (trimethylsiloxy end-capped, as in the case of samples 2–5), which is outside the scope of the present invention. While the optical properties are very good, the smoke and heat values are generally unacceptable.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the claimed inventive concept.

All of the patents, patent applications, articles, and texts which are mentioned above are incorporated herein by reference.

What is claimed:

1. A flame retardance additive for an aromatic-based polymer, comprising a copolymer of an aryl-containing silicone compound and a diorganic polysiloxane compound, wherein said aryl-containing silicone compound has a structural formula

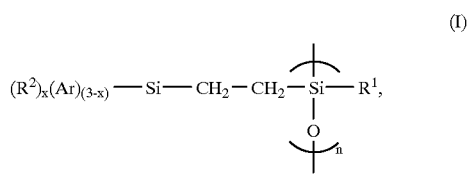

wherein Ar is an aromatic group or a substituted aromatic group;

$R^1$ is hydrogen; an alkyl group; an unsaturated alkyl group, or an aromatic group;

$R^2$ is a $C_1$ to $C_{18}$ alkyl group, or branched or halogenated derivative of that alkyl group; an aromatic group or substituted aromatic group different from the Ar group; a vinyl group; or an allyl group;

x is 0, 1, or 2; and n is from about 1 to about 100.

2. The flame retardance additive of claim 1, wherein the aromatic-based polymer is substantially transparent, and the compositional ratio of the aryl-containing silicone compound to the diorganic polysiloxane compound is sufficient to substantially maintain the transparency of the aromatic-based polymer, while improving the flame-retardant characteristics of the polymer.

3. The flame retardance additive of claim 1, wherein the molar ratio of the diorganic polysiloxane compound to the aryl-containing silicone compound is in the range of about 80:20 to about 20:80.

4. The flame retardance additive of claim 1, wherein Ar is selected from the group consisting of phenyl, tolyl, xylyl, alkyl-substituted versions of any of the foregoing, and halogen-substituted versions of any of the foregoing.

5. The flame retardance additive of claim 4, wherein Ar is a phenyl group or a substituted phenyl group.

6. The flame retardance additive of claim 1, wherein $R^1$ is hydrogen, methyl, ethyl, vinyl, or phenyl.

7. The flame retardance additive of claim 1, wherein the aryl-containing silicone compound comprises triphenyl groups attached to silicon.

8. The flame retardance additive of claim 7, wherein the aryl-containing silicone compound is selected from the group consisting of methyl-2-triphenyl silyl ethyl siloxane; methyl-2-tritolyl silyl ethyl siloxane; methyl-2-diphenylmethyl silyl ethyl siloxane; and ethyl-2-triphenyl silyl ethyl siloxane.

9. The flame retardance additive of claim 1, wherein the diorganic polysiloxane compound has the formula

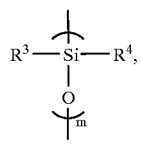

wherein $R^3$ and $R^4$ are independently selected from the group consisting of $C_1$ to $C_{18}$ alkyl groups, or branched or halogenated derivatives of those groups; an aromatic group or a substituted aromatic group; a vinyl group; and an allyl group; and m is in the range of about 3 to about 100.

10. The flame retardance additive of claim 9, wherein $R^3$ is methyl or ethyl.

11. The flame retardance additive of claim 10, wherein $R^4$ is selected from the group consisting of methyl, vinyl, phenyl, or hydrogen.

12. The flame retardance additive of claim 11, wherein the diorganic polysiloxane compound is dimethylsiloxane.

13. The flame retardance additive of claim 1, comprising sufficient aryl content to provide a refractive index in the range of about 1.55 to about 1.65 for the copolymer.

14. The flame retardance additive of claim 1, wherein the copolymer comprises at least about 0.25 aryl groups per silicon atom.

15. The flame retardance additive of claim 14, wherein the copolymer comprises at least about 0.5 aryl groups per silicon atom.

16. The flame retardance additive of claim 14, wherein the aryl groups are phenyl groups.

17. The flame retardance additive of claim 1, wherein the copolymer has a degree of polymerization in the range of about 2 to about 200.

18. A polymer composition, comprising:
   (a) an aromatic-based polymer; and
   (b) a copolymer of an aryl-containing silicone compound and a diorganic polysiloxane compound,
   wherein component (b) is present in an amount sufficient to provide flame retardance for the composition while also retaining substantial transparency for articles formed from the polymer composition, and
   wherein said aryl-containing silicone compound has a structural formula

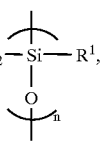

wherein Ar is an aromatic group or a substituted aromatic group;

$R^1$ is hydrogen; an alkyl group; an unsaturated alkyl group, or an aromatic group;

$R^2$ is a $C_1$ to $C_{18}$ alkyl group, or branched or halogenated derivative of that alkyl group; an aromatic group or substituted aromatic group different from the Ar group; a vinyl group; or an allyl group;

x is 0, 1, or 2; and n is from about 1 to about 100.

19. The polymer composition of claim 18, wherein component (b) is present at a level in the range of about 0.1% by weight to about 10% by weight, based on the total solids weight of the polymer composition.

20. The polymer composition of claim 19, wherein component (b) is present at a level in the range of about 0.5% by weight to about 2% by weight.

21. The polymer composition of claim 18, wherein the molar ratio of the diorganic polysiloxane compound to the aryl-containing silicone compound is in the range of about 80:20 to about 20:80.

22. The polymer composition of claim 18, wherein the diorganic polysiloxane compound has the formula

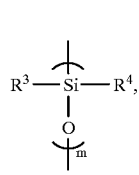

wherein $R^3$ and $R^4$ are independently selected from the group consisting of $C_1$ to $C_{18}$ alkyl groups, or branched or halogenated derivatives of those groups; an aromatic group or a substituted aromatic group; a vinyl group; and an allyl group; and m is in the range of about 3 to about 100.

23. The polymer composition of claim 18, wherein component (a) is selected from the group consisting of polycarbonates, polyphenylene ethers, polyimides, polyesters, acrylonitrile-butadiene-styrene (ABS); copolymers based in part on any of the foregoing; and blends based in part on any of the foregoing.

24. The polymer composition of claim 22, wherein component (a) comprises a bisphenol A-based polycarbonate resin.

25. An article molded from the polymer composition of claim 18.

* * * * *